United States Patent [19]

Bieler

[11] Patent Number: 4,521,145
[45] Date of Patent: Jun. 4, 1985

[54] CUTTING OR DRILLING APPARATUS

[76] Inventor: Hans Bieler, 7402 Bonaduz, Switzerland

[21] Appl. No.: 533,791

[22] Filed: Sep. 19, 1983

[30] Foreign Application Priority Data

Sep. 20, 1982 [CH] Switzerland .................. 5529/82

[51] Int. Cl.³ .................. B23B 49/00; B23C 9/00
[52] U.S. Cl. .................. 409/218; 408/202; 408/241 S
[58] Field of Search .......... 408/113, 116, 202, 241 R, 408/241 S; 409/218; 82/34 A

[56] References Cited

U.S. PATENT DOCUMENTS

| 2,231,864 | 2/1941 | Abel | 408/202 |
| 3,017,643 | 1/1962 | Lehde, Jr. | 408/202 |
| 3,336,611 | 8/1967 | Schepp | 408/202 X |

FOREIGN PATENT DOCUMENTS

| 2209668 | 9/1973 | Fed. Rep. of Germany | 408/202 |
| 2333662 | 1/1975 | Fed. Rep. of Germany | 408/116 |

Primary Examiner—Z. R. Bilinsky
Attorney, Agent, or Firm—Yount & Tarolli

[57] ABSTRACT

A cutting or drilling apparatus comprises a body member adapted to be fixed to the chuck of a driving means for driving the apparatus into rotational movement. The body member receives the cutting or drilling tool at one front side thereof and is equipped with a coaxially arranged sleeve member, which is slidably and rotatably connected thereto. First, stop means limit sliding and rotational movement and second, locking means block sliding and rotational movement of the sleeve member. A scale on the sleeve member indicates the amount of axial displacement thereof relative to the body member. The apparatus is especially suitable for use with a conical sheet metal drilling tool.

8 Claims, 4 Drawing Figures

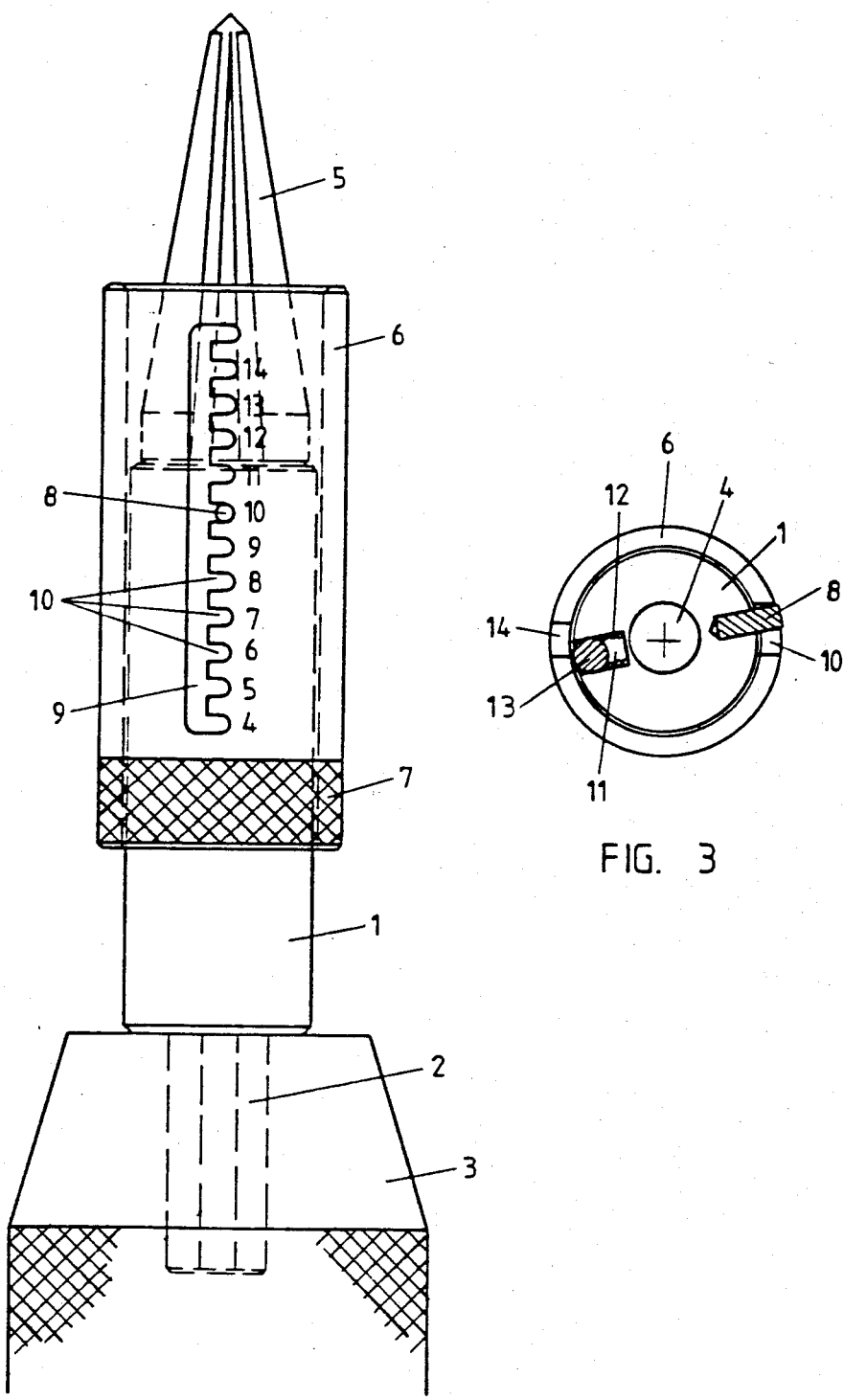

CUTTING OR DRILLING APPARATUS

BACKGROUND OF THE INVENTION

1. Field of the Invention

The present invention refers to a cutting or drilling apparatus adapted to be driven to rotational movement, in particular to an apparatus receiving a cutting tool or a drilling tool to make holes of a predetermined depth and/or diameter in a workpiece. It is a frequent problem to make a hole or a blind bore having an exactly predetermined depth in a workpiece. If one uses a hand operated drill without any depth stop, it is a difficult task to make a blind bore with the exactly required depth. On the other side, if one uses a conical cutting tool to effect a hole in e.g. sheet metal, it may be very difficult to perform the hole with exactly the required diameter.

2. Prior Art

U.S. Pat. No. 4,039,266, O'Connell, of Aug. 2, 1977 discloses a longitudinal cutting tool comprising a stop collar received on said cutting tool. The stop collar has a stop surface and may be slided and fixed along the cutting tool to determine the depth by which the cutting tool, e.g. a drilling tool, may penetrate a workpiece. Thereby, it is certainly possible to make blind bores of an exactly predetermined depth in a work piece, but everytime you want to change the depth, you have to measure the distance between the tip of the drilling tool and the stop surface and to readjust the stop collar carefully to achieve the desired depth. Moreover, you will need a screwdriver or the like tool to readjust the stop collar and to fix it again. Such stop collars of the prior art may not be used at all with conically shaped cutting tools, e.g. as they are used to cut a circular hole into a sheet metal workpiece. It is well known to anybody skilled in the art that the diameter of the hole in the workpiece strictly depends from the penetration depth of such a conical cutter into the workpiece. It is further of paramount importance to guide the conical tool exactly in a right angle to the workpiece to ensure that the resulting hole is perfectly circular and to avoid a blocking of the tool. As these cutting tools are not of cylindrical shape, the known stop collars may not be used and one has no other choice than to guide the tool by free hands. The result may be that the hole is not perfectly round and that the desired diameter is not attained as exactly as would be expected.

OBJECTS OF THE INVENTION

It is an object of the present invention to provide an apparatus of the kind described above which comprises means assisting in drilling blind bores of an exactly defined and presettable depth by means of a cylindrical drilling tool. A further object of the invention is to provide an apparatus which comprises means assisting in cutting circular holes with an exactly defined diameter in sheet metal, having an exact circular shape. A still further object of the invention is to provide an apparatus which can be adjusted easily and quickly, without the need of any additional tools, to another preset hole depth or to another preset cutting diameter.

SUMMARY OF THE INVENTION

According to the present invention, there is provided an apparatus for cutting or drilling holes adapted to be driven to a rotational movement by means of a suitable driving means. It comprises an essentially cylindrical body member which has on one side receiving means to receive a cutting or drilling tool, e.g. a central, frontal bore with a radially extending, threaded hole equipped with a locking screw. On the opposite side there is provided a protruding shaft adapted to be received in the chuck of a driving apparatus. An essentially cylindrical sleeve member is coaxially mounted on said body member and slideably as well as rotatably connected thereto. First, locking means are adapted to limit the sliding, longitudinal displacement and the rotational movement of the sleeve member relative to the body member, and second, locking means are adapted to block the longitudinal and rotational displacement of the sleeve relative to the body member. A scale is provided on the sleeve member to indicate the amount of relative displacement between body member and sleeve member.

BRIEF DESCRIPTION OF THE DRAWINGS

In the following there will be described a preferred embodiment of the apparatus according to the invention, with reference to the accompanying drawings, in which:

FIG. 3 is a sectional view similar to FIG. 2, but the sleeve member being in an unlocked position, and FIG. 4 is a side elevational view of the apparatus, similar to FIG. 1, but with the sleeve member being partially displaced relative to the body member.

DESCRIPTION OF A PREFERRED EMBODIMENT

Figures 1, 2:
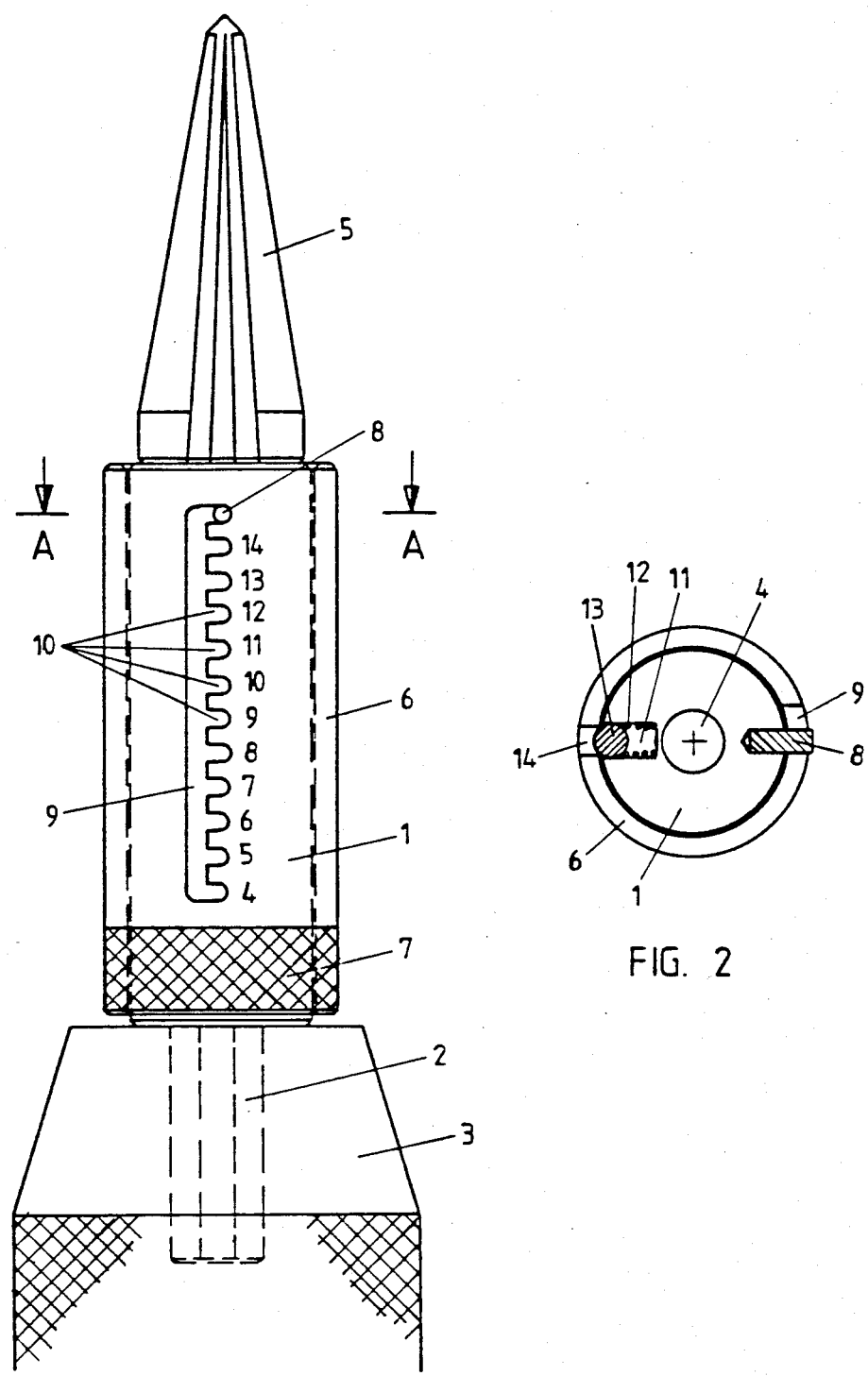
FIG. 1 is a side elevational view of the apparatus, the sleeve member being in its retracted position.
FIG. 2 is a sectional view of the apparatus shown in FIG. 1, taken along line A—A, the sleeve member being in a locked position.

As can be seen from FIG. 1 the apparatus according to the present invention comprises a body member 1 with an essentially cylindrical, elongated shape. The lower frontal end of the body member 1 is equipped with a centrally arranged shaft 2 protruding from the surface of the body member 1. By means of this shaft 2 the apparatus may be received in the chuck 3 of a suitable driving means, not shown in the drawings, e.g. a hand held electric drilling machine. The opposite frontal end of the body member 1 is equipped with a central blind bore 4, which can be seen in FIGS. 2 and 3. The bore 4 is adapted to receive the shaft (not shown) of a drilling or cutting tool 5 and preferably has a cylindrical shape. Of course the bore 4 comprises suitable means to lock the shaft of the tool 5 to the body member 1. Such means may comprise a radial, threaded bore extending from the outer surface of the body member 1 to the interior of the bore 4 and containing a locking screw which may be rotated to be pressed against the surface of the tool shaft inserted into the bore 4. This radial bore and locking screw are not shown in the drawing because its construction is clear to any person skilled in the art.

The body member 1 receives a sleeve member 6, the inner diameter and the length thereof essentially corresponding to the outer diameter and the length of the body member 1. It may be advantageous to provide at least a part of the outer surface of the sleeve member 6 with a corrugated region to assist in gripping and manipulating the apparatus.

The sleeve member 6 is coaxially arranged on the body member 1 and slideably as well as rotatably connected thereto. The amount of the sliding movement, i.e. the displacement of the sleeve member 6 relative to the body member 1 in longitudinal direction is limited by locking means, which also are adapted to block an unintended displacement of the sleeve member 6. Similarly the amount of rotational movement of the sleeve member 6 relative to the body member 1 is limited by these locking means.

The locking means comprise a pin 8 inserted into the body member 1 and protruding a certain amount from its outer cylindrical surface. Further there is provided an elongate slot 9 in the wall of the sleeve member 6. The slot 9 extends over the main part of the length of the sleeve member 6 and is arranged parallel to the axis thereof. A plurality of recesses 10 is arranged side by side along one of the longitudinal edges of the slot. When the apparatus is assembled, the pin 8 penetrates the slot 9 and enables the sleeve member 6 to be displaced longitudinally in relation to the body member 1. However, the ends of the slot 9 limit such longitudinal displacement and prevent the sleeve member 6 from being removable from the body member 1.

The pin 8 and the slot 9, in combination with the recesses 10 further limit the rotational movement of the sleeve member 6 relative to the body member 1. It can be clearly seen in FIGS. 1 and 4 that, upon rotation of the sleeve member 6 relative to the body member 1, the pin 8 enters one of the recesses 10. Thereby the sleeve member 6 is prevented from further displacement and its longitudinal position is exactly defined.

In order to prevent the sleeve member 6 from unintentionally being rotated relative to the body member 1, the apparatus is provided with locking means. According to FIGS. 2 and 3, these locking means comprise a blind bore 11 in the body member 1, extending radially inwards from the outer surface thereof and receiving a spring 12 as well as a ball 13. The locking means further comprise a plurality of bores 14 arranged in a row in the wall of the sleeve member 6. The diameter of these bores 14 is somewhat less than the diameter of the ball 13. As the spring 12 is biased against the ball 13, the latter is urged out of the blind bore 11. The arrangement is such that the bores 14 may be brought into coincidence with the blind bore 11, whereby the ball 13 penetrates one of the bores 14 to a certain amount, thereby blocking any displacement of the sleeve member 6 relative to the body member 1.

The bores 14 are arranged in the wall of the sleeve member 6 in a row extending parallel to the axis of the sleeve member 6. The distance between two adjacent bores 14 corresponds exactly to the distance between two adjacent recesses 10 in the edge of the slot 9. The relative position between pin 8, slot 9 and recesses 10 on the one hand and blind bore 11 and bores 14 on the other hand is adapted in such a way, that the ball 13 partially penetrates one of the bores 14 as soon as the pin 8 has engaged one of the recesses 10.

Advantageously the pin 8 and the blind bore 11 are in diametrally opposed positions, and the recesses 10 as well as the bores 14 are in diametrally opposed positions.

It will be quite clear from the foregoing, that a blocking of the longitudinal displacement of the sleeve member 6 automatically effects a blocking of the rotational movement thereof, as the ball 13 penetrates one of the bores 14, under influence of the spring 12, as soon as and always when the pin 8 engages one of the recesses 10. However, if the pin 8 is situated in the region of the slot 9, there isn't any coincidence between blind bore 11 and one of the bores 14; any blocking effect, in longitudinal as well as in rotational direction, is removed and the sleeve member 6 may freely be displaced along the body member 1.

Next to the recesses 10 there are provided numerical indices giving a relation for the amount of the displacement of the sleeve member 6 along the body member 1. In the embodiment according to FIGS. 1 and 4, the recesses 10 are marked with numerals ranging from 4 to 14. These numerals indicate the resulting diameter of a hole in millimeters cut by means of a conical cutter 5, if the sleeve member 6 is displaced to such an amount that the pin 8 engages that recesses 10 with the corresponding index. For example, in FIG. 4, the sleeve member is displaced to such an amount that the pin 8 engages the recess 10 with the index "10". This means, if a hole is cut by means of the cutting tool 5 and the latter penetrates the workpiece until the front face of the sleeve member abuts the surface of the workpiece, a hole with a diameter of exactly 10 mm will result, as the cutting tool 5 has, at this position, a diameter of exactly 10 mm. Of course, the index scale must correspond to the kind and dimension of the cutting or drilling tool to be used with the apparatus according to the invention. Another possibility is to use an index scale which directly shows the distance from the tip of the cutting or drilling tool to the frontal stop surface of the sleeve member 6, abuting against the surface of the workpiece. This embodiment would be most useful with cylindrical drilling tools in drilling blind bores which must have an exactly predetermined depth.

In using the apparatus according to the present invention together with a conical cutting tool 5 as shown in the drawings, the user is automatically forced to guide the tool in the desired right angle to the workpiece. As soon as the frontal face of the sleeve member 6 approaches the surface of the workpiece, it will not be difficult at all to eventually correct the angular position of the tool 5 into the desired, right-angled position, if necessary, and as soon as said frontal face at least partially contacts the workpiece surface, the tool 5 is forced into an exactly right-angled position as long as it further penetrates the workpiece. Moreover, thereby is assured that the resulting hole will be exactly circular and the danger of blocking the tool is avoided.

Any readjustment of the apparatus may be performed easily and quickly without the need of using additional adjustment tools. If the sleeve member 6 is vigorously rotated, the blocking against rotation is released, the pin 8 leaves the recess 10 and enters the slot 9, and the sleeve member may be slid by longitudinal displacement into the desired position. Then the sleeve member 6 is rotated back to bring the pin 8 into engagement with the nearest recess 10, whereby the blocking mechanism, comprising spring 12, ball 13 and corresponding bore 14 engages again.

The recesses 10 are, compared with the direction of rotation of the driving means, in a leading position. Thereby is ensured that the pin 8 is prevented from getting out of engagement with the correlated recess 10, if the sleeve member 6 is braked or otherwise inhibited in it's rotation, but is pressed even stronger into the recess 10.

The apparatus according to the present invention is very simple in construction and easy to use. It may be very useful to any hobbyworker, craftsman, mechanic and the like, especially if they have to work with an unguided, hand-held machine. On the one side, it is thereby possible to reliably make precise, circular holes, while on the other side the danger of accidents is greatly reduced.

What I claim is:

1. An apparatus for cutting or drilling a workpiece including:
    an essentially cylindrical body member having, on one end thereof, tool receiving means for receiving a cutting or drilling tool and, on the other end thereof, connection means for connecting said body member to a driving means, and
    adjustable means for controlling the position of the tool relative to a workpiece comprising
    an essentially cylindrical sleeve member coaxially received on said body member and slidably and rotatably connected thereto, said sleeve member having a scale thereon for indicating a plurality of different predetermined axial positions of said sleeve member relative to said body member and tool which plurality of different predetermined axial positions define a plurality of positions of the tool relative to the workpiece, said sleeve member having a surface which is blocked by the workpiece from movement toward the workpiece and thus defines the position of the tool relative to the workpiece, and
    locking means for locking said sleeve member in said plurality of different predetermined axial positions relative to said body member, said locking means comprising a pin radially extending from said body member, a slot arranged in the wall of said sleeve member and extending parallel to the axis of said sleeve and body members, and a plurality of recesses arranged side-by-side along a longitudinal edge of said slot, engagement of said pin with one of said plurality of recesses defining one of said plurality of different predetermined axial positions of said sleeve member relative to said body member.

2. An apparatus according to claim 1, wherein said receiving means comprise a central, frontal bore arranged on one end of the body member and having a radially extending threaded hole with a locking screw therein, extending from the outer surface of said body member to said central bore, adapted to receive a shaft of said cutting or drilling tool.

3. An apparatus according to claim 2, wherein said connection means comprise a central shaft arranged on the back side of said body member opposite to said central bore and protruding from said back side, adapted to be connected to the chuck of the driving means.

4. An apparatus according to claim 1, wherein said locking means further comprise a ball and a spring received in a radially extending blind bore of said body member, and wherein said sleeve member comprises a plurality of holes arranged in a row parallel to the axis of said sleeve member, said holes having a smaller diameter than said ball and said spring urging said ball to the outside of said blind bore, an outer surface of said ball thereby engaging one of said holes.

5. An apparatus according to claim 4 wherein said blind bore is arranged in the same diametral plane as said pin and the number of holes in said plurality of holes equals the number of recesses in said plurality of recesses, each respective hole and recess being arranged in the same diametral plane.

6. An apparatus according to claim 1, wherein the width of said recesses is substantially equal to the diameter of said pin, and wherein at least a part of said recesses is equipped with a numerical index to indicate said predetermined axial positions of said sleeve member relative to said body member.

7. An apparatus according to claim 1 wherein said tool is a cylindrical tool used for making a blind hole in the workpiece, and said plurality of positions of the tool relative to the workpiece define a plurality of depths of said blind hole which said tool is able to make in the workpiece.

8. An apparatus according to claim 1 wherein said tool is a conical tool used for making a hole in a sheet workpiece, and said plurality of positions of the tool relative to the workpiece define a plurality of diameters of said hole which said tool is able to make in the sheet workpiece.

* * * * *